United States Patent
Mistkawi et al.

(10) Patent No.: US 9,070,007 B2
(45) Date of Patent: Jun. 30, 2015

(54) ADJUSTABLE DATA READER WITH PIVOT MOUNT

(71) Applicant: Datalogic ADC, Inc., Eugene, OR (US)

(72) Inventors: Joseph G. Mistkawi, Tigard, OR (US); Pietro Todescato, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/150,565

(22) Filed: Jan. 8, 2014

(65) Prior Publication Data
US 2014/0197240 A1    Jul. 17, 2014

Related U.S. Application Data

(60) Provisional application No. 61/751,777, filed on Jan. 11, 2013.

(51) Int. Cl.
  *G06K 7/10*    (2006.01)
  *G06K 7/00*    (2006.01)

(52) U.S. Cl.
  CPC .......... *G06K 7/0017* (2013.01); *G06K 7/10821* (2013.01)

(58) Field of Classification Search
  CPC .......................... G06K 7/0017; G06K 7/10281
  USPC ................. 235/462.43, 462.44, 470
  See application file for complete search history.

(56) References Cited

U.S. PATENT DOCUMENTS

| | | | |
|---|---|---|---|
| 3,650,503 A * | 3/1972 | Seidel .................. | 248/285.1 |
| 4,554,590 A * | 11/1985 | Chelin et al. ........... | 348/827 |
| 4,963,721 A * | 10/1990 | Kohno et al. ........... | 186/61 |
| 5,105,070 A * | 4/1992 | Wike et al. ............ | 235/462.45 |
| 5,108,062 A * | 4/1992 | Detwiler ............... | 248/185.1 |
| 5,192,857 A   | 3/1993 | Detwiler | |
| 5,198,650 A * | 3/1993 | Wike, Jr. .............. | 235/462.45 |
| 5,202,712 A * | 4/1993 | Fitz et al. ............. | 396/428 |
| 5,477,044 A * | 12/1995 | Aragon ................ | 235/472.01 |
| 5,567,927 A * | 10/1996 | Kahn et al. ............ | 235/462.01 |
| 5,726,434 A * | 3/1998 | Seo .................... | 235/462.11 |
| 5,796,088 A * | 8/1998 | Wall ................... | 235/472.01 |
| 5,971,268 A   | 10/1999 | Lynch et al. | |
| 6,065,676 A * | 5/2000 | Ring et al. ............ | 235/462.43 |
| 6,082,986 A   | 7/2000 | Seward et al. | |
| 6,244,510 B1 * | 6/2001 | Ring et al. ............ | 235/462.43 |
| 6,257,492 B1 * | 7/2001 | Bressler et al. ........ | 235/462.43 |

(Continued)

OTHER PUBLICATIONS

Korean Intellectual Property Office, International Search Report and Written Opinion, International Patent Application No. PCT/US2014/010918, dated Apr. 25, 2014, 16 pages.

*Primary Examiner* — Daniel Walsh
(74) *Attorney, Agent, or Firm* — Stoel Rives LLP

(57) ABSTRACT

A data reading system for reading encoded data, such as barcode labels or RFID tags, from an item. The data reading system includes a housing, a data reader disposed within the housing, the data reader configured to read the encoded data from the item through a scan window on the housing. A clamp secures the housing to a receiving post on a base mount, and supports rotational movement of the housing about both a first axis and a second axis. In one configuration, the clamp and receiving post each include through holes that together form a passageway to support a communication/power cable from the base mount through the passageway and into an interior portion of the housing to communicate with and/or provide power to the data reader without limiting rotational movement of the housing.

20 Claims, 15 Drawing Sheets

(56) References Cited

U.S. PATENT DOCUMENTS

| | | | |
|---|---|---|---|
| 6,286,760 B1* | 9/2001 | Schmidt et al. | 235/462.32 |
| 6,460,768 B2 | 10/2002 | Ring et al. | |
| 6,651,890 B2* | 11/2003 | Byun et al. | 235/462.43 |
| 7,137,560 B2* | 11/2006 | Hammer | 235/462.39 |
| 7,165,724 B2* | 1/2007 | Shimoda et al. | 235/462.45 |
| 2001/0032884 A1 | 10/2001 | Ring et al. | |
| 2002/0030107 A1* | 3/2002 | Byun et al. | 235/462.45 |
| 2002/0063988 A1* | 5/2002 | Shibayama | 360/75 |
| 2003/0019938 A1* | 1/2003 | Byun et al. | 235/462.43 |
| 2003/0040656 A1* | 2/2003 | Pagliuca et al. | 600/102 |
| 2003/0097236 A1* | 5/2003 | E. James | 702/151 |
| 2003/0178492 A1* | 9/2003 | Tamburrini et al. | 235/472.01 |
| 2003/0221959 A1* | 12/2003 | Cochran | 204/280 |
| 2003/0222147 A1* | 12/2003 | Havens et al. | 235/462.45 |
| 2004/0046030 A1* | 3/2004 | Okada et al. | 235/462.41 |
| 2004/0113033 A1* | 6/2004 | Johnson | 248/183.3 |
| 2005/0040238 A1* | 2/2005 | Byun et al. | 235/462.43 |
| 2005/0269473 A1* | 12/2005 | Carnevali et al. | 248/311.2 |
| 2006/0113394 A1* | 6/2006 | Hammer | 235/462.39 |
| 2006/0170817 A1* | 8/2006 | Wu | 348/373 |
| 2008/0142603 A1* | 6/2008 | Mynhardt | 235/462.43 |
| 2009/0138233 A1* | 5/2009 | Kludas et al. | 702/158 |
| 2010/0005636 A1* | 1/2010 | Liao et al. | 24/652 |
| 2010/0108763 A1* | 5/2010 | Verhoeven | 235/454 |
| 2010/0155483 A1* | 6/2010 | Craig et al. | 235/462.32 |
| 2010/0264282 A1* | 10/2010 | Burklin | 248/124.2 |
| 2010/0288896 A1* | 11/2010 | Church | 248/226.11 |
| 2011/0006170 A1* | 1/2011 | Liu et al. | 248/121 |
| 2012/0230668 A1* | 9/2012 | Vogt | 396/428 |
| 2013/0256551 A1* | 10/2013 | Yao | 250/393 |
| 2014/0197240 A1* | 7/2014 | Mistkawi | 235/470 |
| 2014/0209777 A1* | 7/2014 | Klemin et al. | 248/544 |

* cited by examiner

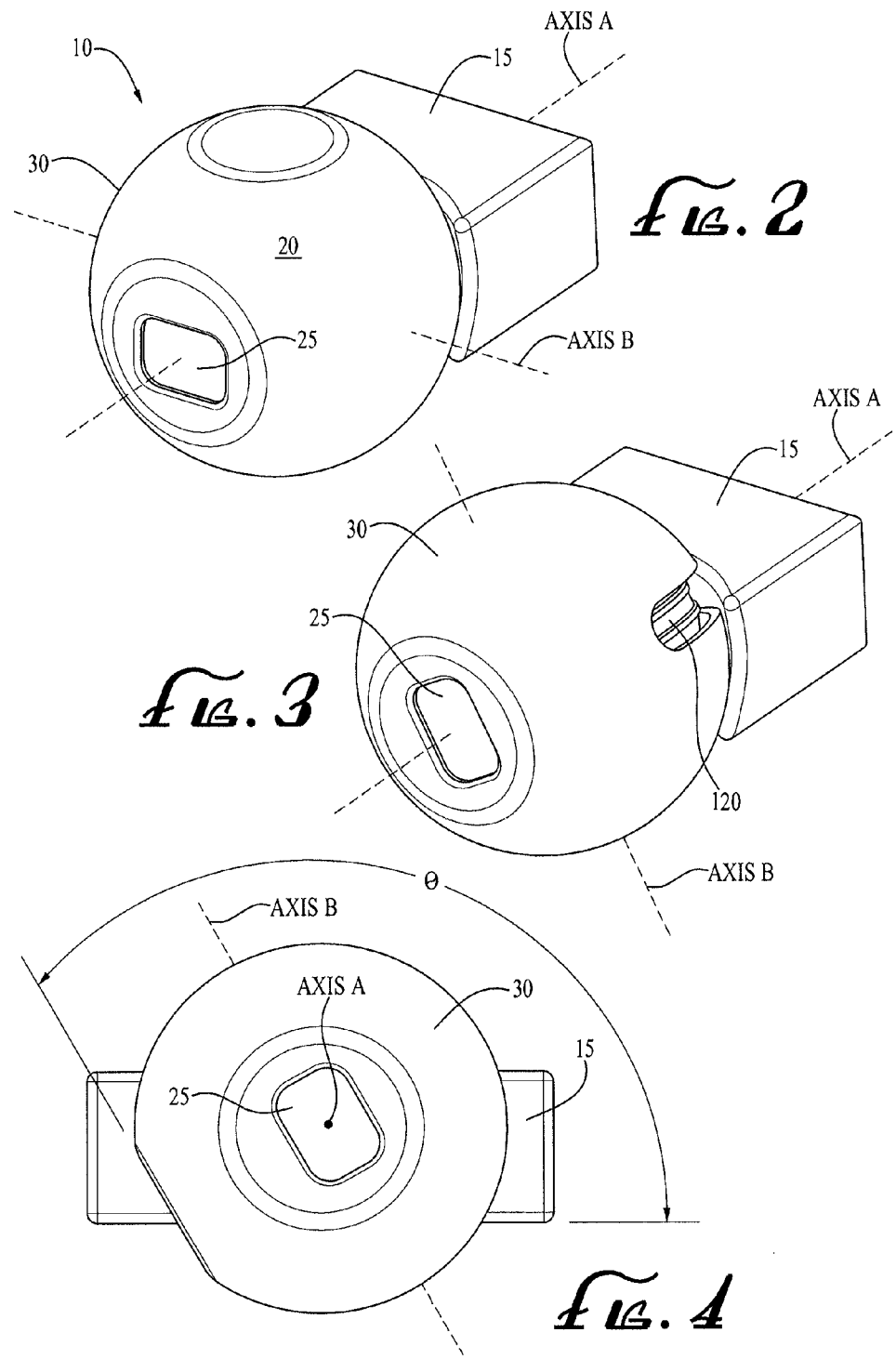

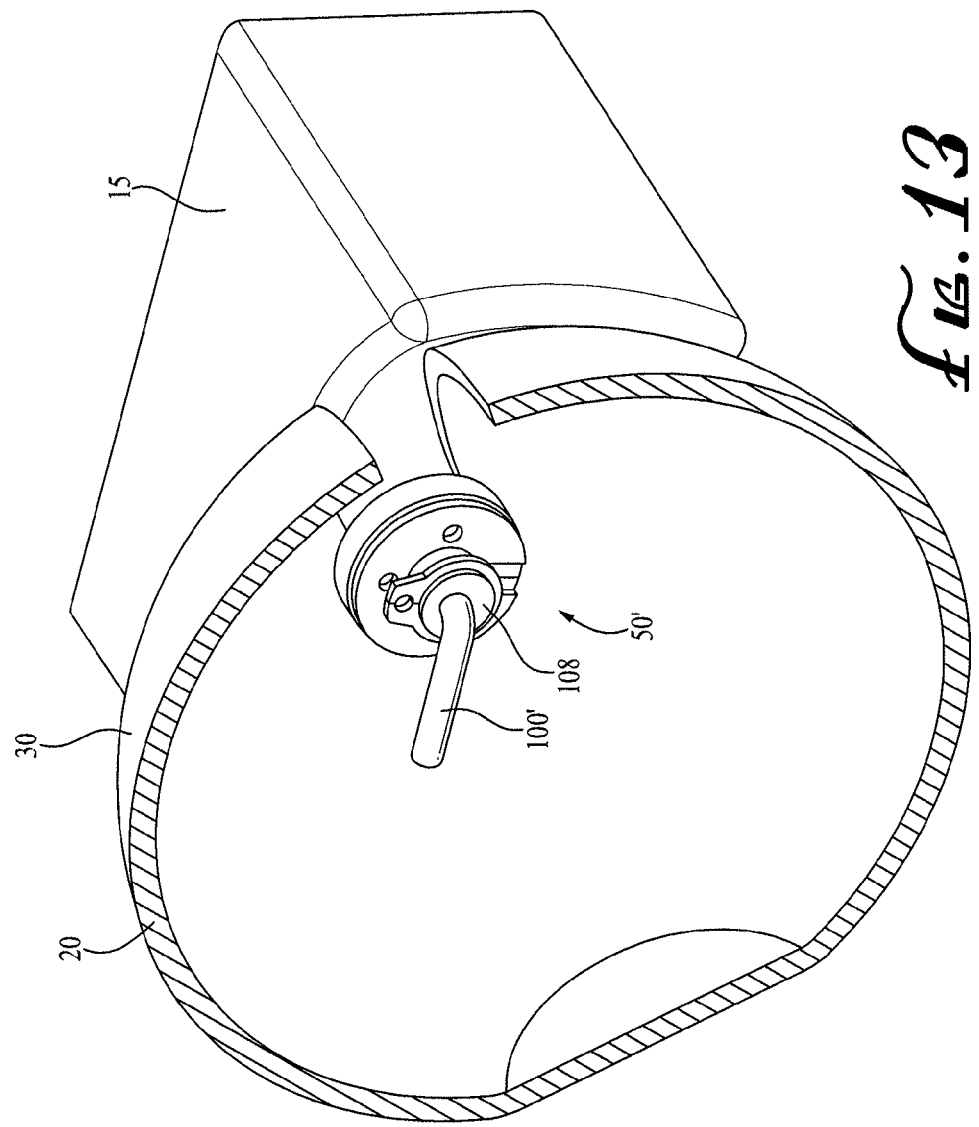

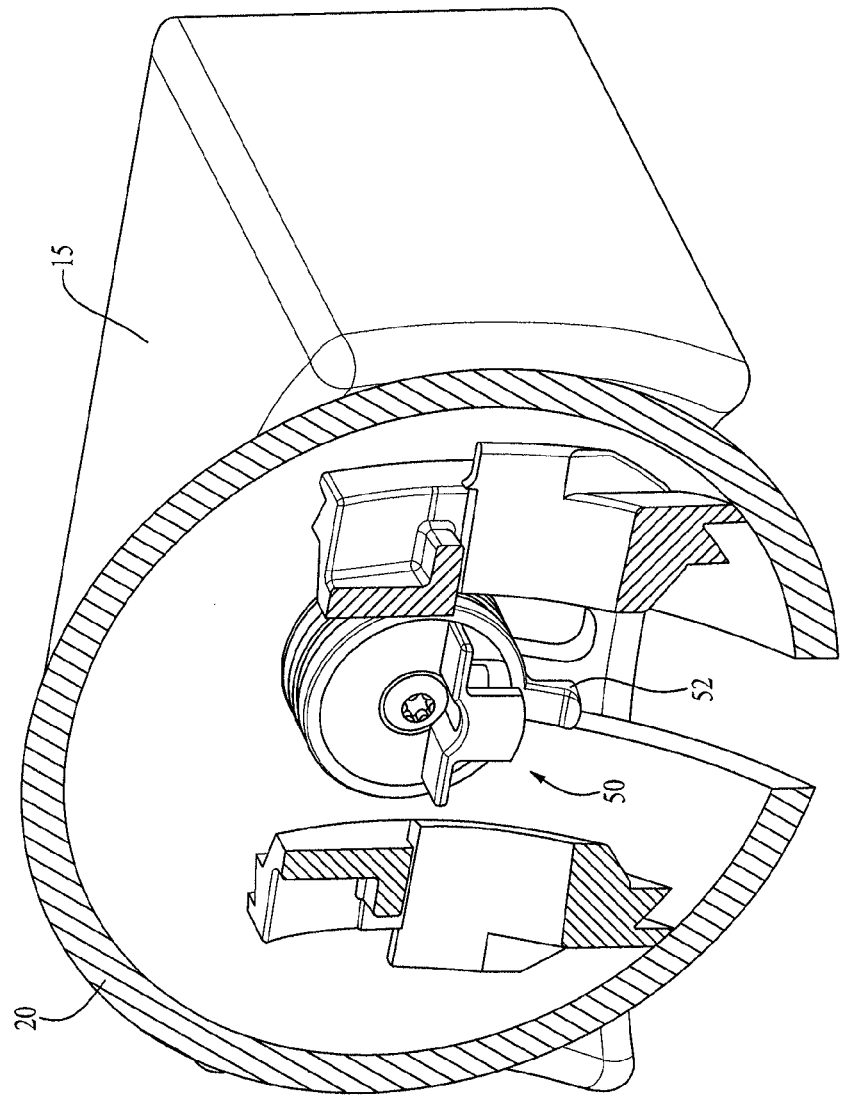

ADJUSTABLE DATA READER WITH PIVOT MOUNT

RELATED APPLICATION DATA

This application is a nonprovisional of and claims the benefit under 35 U.S.C. §119(e) from U.S. Provisional Patent Application No. 61/751,777, filed Jan. 11, 2013, and titled ADJUSTABLE DATA READER WITH PIVOT MOUNT, which is incorporated by reference herein in its entirety.

BACKGROUND

The field of the disclosure relates generally to systems and methods of data reading, and more particularly, to data readers capable of rotating about two different axes for aiming and positioning the data reader in various configurations.

Data reading devices, such as barcode or optical code scanners, RFID readers, and the like, are widely used to read data in the form of optical codes, digital watermarks, or other encoded symbols printed on various objects. These systems may be used in a wide variety of applications, such as inventory control and point-of-sale transactions in retail stores. Perhaps one of the more well-known data readers are barcode scanners, which are typically used to read barcodes on items that may be sold in retail and grocery store settings. Barcode scanners are used to capture barcode patterns, symbols or other information imprinted on a surface of an item. The captured data is thereafter transmitted to a host processing device for decoding the data.

Another type of data reader does not use optical barcodes, but instead reads electronic tags using radio waves, such as a radio-frequency identification (RFID) reader. An RFID system typically employs at least two components, a "transponder" or "tag" which is attached to a physical item to be identified, and a "reader" which sends an electromagnetic signal to the transponder and then detects a response. Typically, the reader emits an RF signal, which is received by the transponder, after the transponder comes within an appropriate range. In response, the transponder then sends its information via a modulated RF signal back to the reader. The reader detects this modulated signal, and can identify the transponder by decoding the modulated signal. After identifying the transponder, the reader can either store the decoded information or transmit the decoded signal to a computer or other device.

In some instances, the barcode scanners and RFID readers may be handheld, portable data readers. For example, some barcode scanners used in retail settings can be removed from a cradle, pointed at an item to scan the target data, and then returned to the cradle for future use. In other instances, the data readers may be mounted to a structure, such as a counter or a screen display, and the item bearing the barcode may be presented to the fixed data reader.

The present inventor has recognized some disadvantages with mounted data readers. For instance, mounted data readers are typically stationary units intended to be mounted at a particular orientation with a fixed field-of-view that cannot be altered. Thus, since the data reader's field-of-view is not adjustable, the data reader may have limited mounting options. The present inventor, therefore, has recognized a need for a mounted data reader capable of rotating about two different axes for aiming and positioning the data reader in various configurations. In addition, the present inventor has recognized a need for such a data reader that has cables (e.g., power/communication cables, data transmission wiring, etc.) housed within a pivotable enclosure, where the cables are arranged so as to not interfere with the adjustability of the data reader.

Additional aspects and advantages will be apparent from the following detailed description of preferred embodiments, which proceeds with reference to the accompanying drawings. It should be understood that the drawings depict only certain preferred embodiments and are not to be considered as limiting in nature.

BRIEF DESCRIPTION OF THE DRAWINGS

FIG. 2 is an isometric view of the data reading system of FIG. 1, according to one embodiment.

FIG. 3 is an isometric view of the data reading system of FIG. 2 in a rotated configuration about a first axis.

FIG. 4 is a front elevation view of the data reading system of FIG. 3.

FIG. 13 is a cross-section view of the data reading system of FIG. 2 illustrating another example internal swivel clamp mechanism.

FIGS. 15 and 16 are cross-section views of the data reading system of FIG. 2 illustrating an example internal swivel clamp mechanism with a stop arm for limiting rotation of the data reader.

DETAILED DESCRIPTION OF PREFERRED EMBODIMENTS

Figure 1:
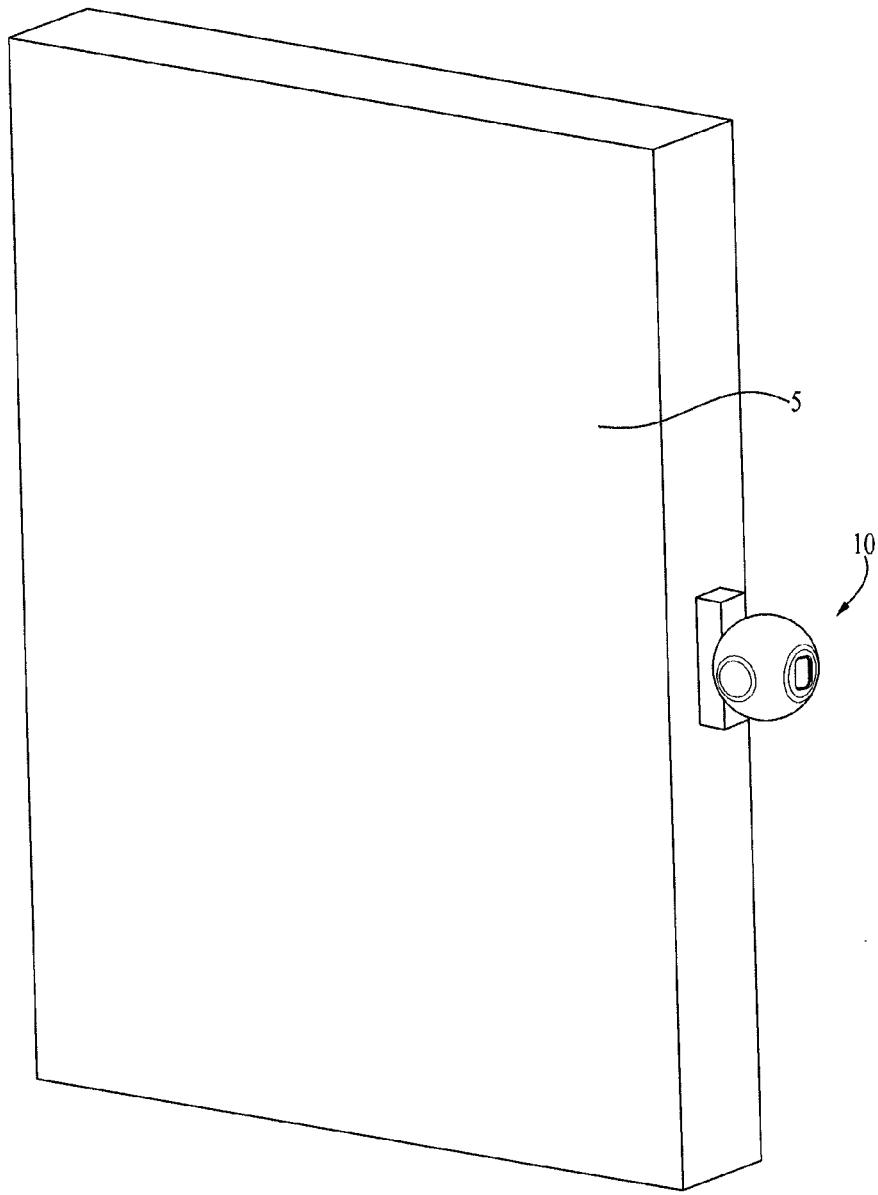
FIG. 1 is a schematic illustration of a data reading system mounted on a side surface of a support structure.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

In the following description of the figures and any example embodiments, the system may be referred to in conjunction with use at a retail establishment. It should be understood that such use is merely one example use for such a system. Other uses for a system with the characteristics and features described herein may be implemented, for example, in an industrial location such as a parcel distribution (e.g., postal) station or for processing inventory, as well as other suitable uses.

FIGS. 1-10 illustrate a data reading system 10 that may be used to read and process an optical code (e.g., a barcode label, digital watermark, etc.) or capture other target data (RFID tags, images, etc.) from various surfaces of an item during a checkout process, such as in a retail establishment or supermarket. The data reading system 10 includes a data reader 30 supported by a base mount 15. The base mount 15 may be attached to a peripheral structure 5 (e.g., a fixed scanner, a computer, a checkstand, a display, etc.).

In a first example structure, the data reader 30 is adjustably or movably mounted to the base mount 15 so that the data reader 30 is free to move relative to the base mount 15 through a range of rotations. The pivoting/rotational movement of the data reader 30 allows a user/operator to orient and aim the data reader 30 as desired. Additional details regarding the movement of the data reader 30 are further described below with particular reference to FIGS. 2-10. As illustrated in FIG. 2, the data reader 30 includes a housing 20 bearing a scan window 25 through which the data reader 30 may capture data (e.g., an optical code) from a target item.

The following section briefly describes an example operation and use of the data reading system 10. In an example operation, the data reader 30 may be mounted (or may be pre-mounted) to the peripheral structure 5 via the base mount 15. During or prior to use/operation, the operator may move or rotate the data reader 30 about one axis and/or rotate the data reader 30 about a second axis to a desired position (e.g., any of the positions shown in FIGS. 2-10) so that a field of view projects through the scan window 25 at a target reading zone. Once the data reader 30 has been aligned as desired, items may be moved through the reading zone, where the data reader 30 captures the target data.

On some occasions, such as when the operator is processing multiple items of the same or similar size, the data reader 30 may be rotated/moved to a desired position and remain in that position during processing. On other occasions, such as when the operator is processing a batch or collection of small and large items together, the operator may choose to aim/reorient the data reader 30 frequently (depending on the size and shape of the item) to ensure that the field of view of the data reader 30 accurately captures the target data on the item.

With reference to FIGS. 2-10, the following section describes example ranges of rotation of the data reader 30 relative to the base 15. FIG. 2 illustrates an initial or neutral position of the data reader 30, that is, a position where the data reader 30 is not rotated relative to the base mount 15. It should be understood that the initial or neutral position shown in FIG. 2 is an arbitrary position to help establish a frame-of-reference with regard to the ranges illustrated in FIGS. 3-10 and described in the following section.

Figure 9:
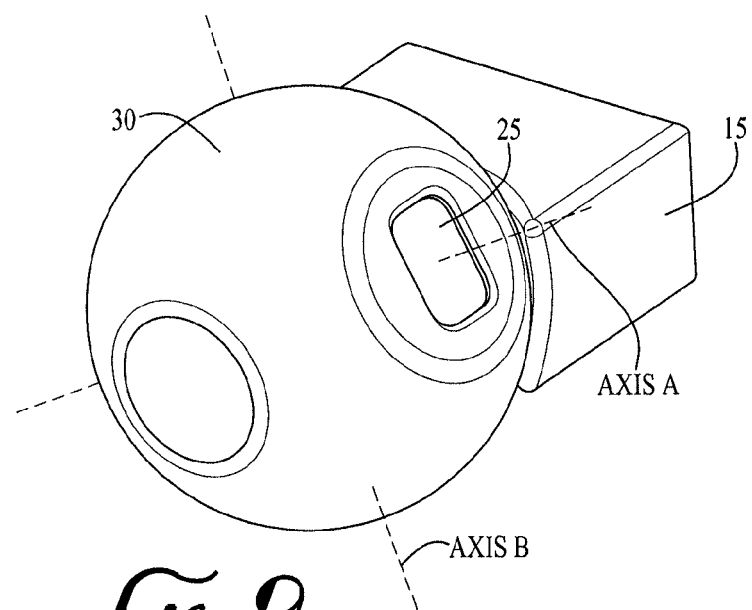
FIG. 9 is an isometric view of the data reading system of FIG. 2 in a rotated configuration about both the first and second axes.
Figure 10:
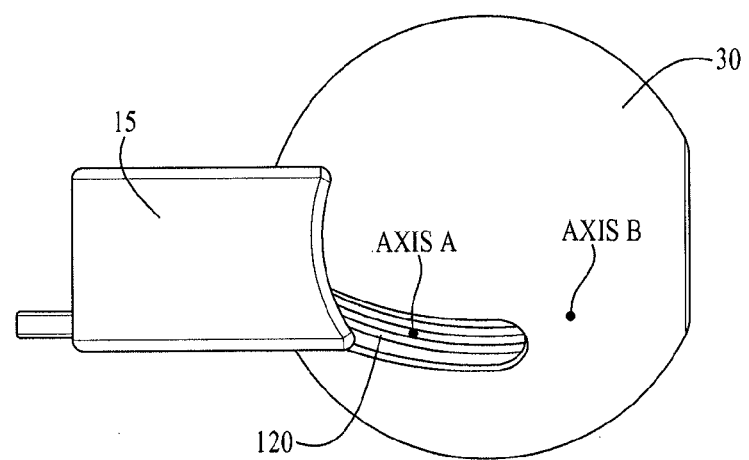
FIG. 10 is a side elevation view of the data reading system of FIG. 9.

It should be understood that in the following description, any specific details relating to example rotational angles and ranges for the data reader 30 are for illustration purposes only and are not meant to be limiting. As a brief overview, FIGS. 3-4 illustrate an example range of rotations about the first axis A with no movement about the second axis B. FIGS. 5-8 illustrate an example range of rotations of the data reader 30 about the second axis B, with no rotation about the first axis A. Finally, FIGS. 9-10 illustrate an example embodiment of the data reader 30 rotated about both the first axis A and the second axis B. Further details of these and other embodiments are described below.

With reference to FIGS. 3-4, in one embodiment, the data reader 30 may be rotated about the first axis A between a rotation angle of −120 degrees and +120 degrees. FIGS. 3 and 4 illustrate two views of the data reader 30 rotated to a rotation angle Θ of +120 degrees (with no rotation about the second axis B). For reference purposes, the rotation angle Θ of +120 degrees may be a counter-clockwise rotation of the data reader 30 from its neutral position (see FIG. 2). Accordingly, in a rotation angle of −120 degrees, the data reader 30 would be rotated in the opposite direction (e.g., clockwise from the neutral position shown in FIG. 2). As is discussed further with particular reference to FIGS. 15-18, the rotational motion of the data reader 30 may be limited by an internal swivel clamp mechanism 50.

Figure 5:
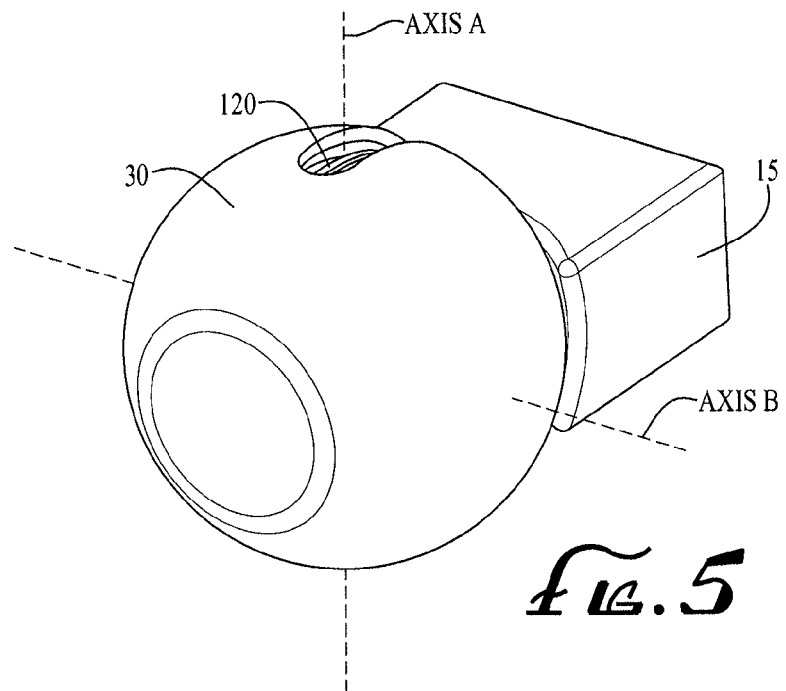
FIG. 5 is an isometric view of the data reading system of FIG. 2 in a rotated configuration about a second axis.
Figure 6:
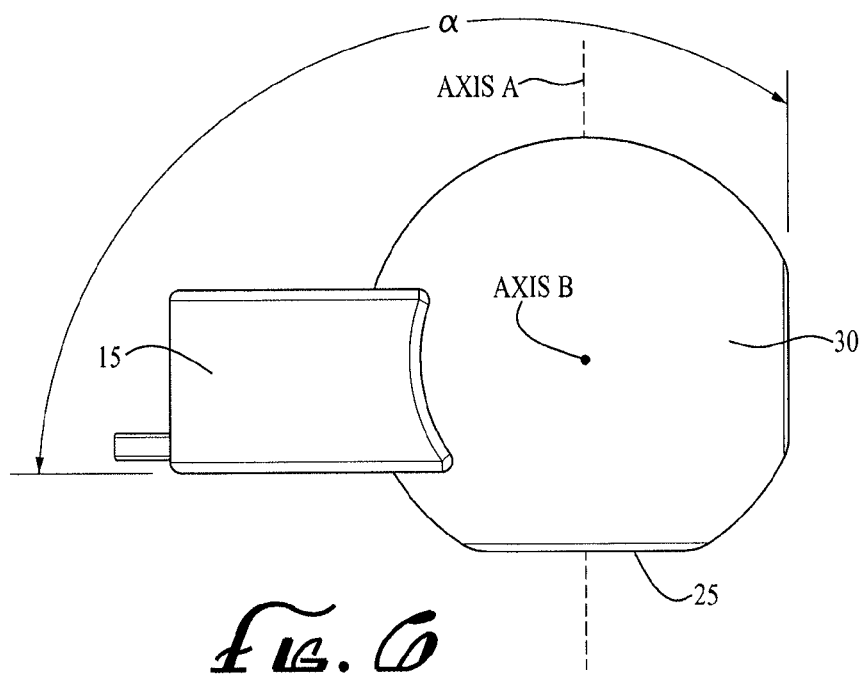
FIG. 6 is a side elevation view of the data reading system of FIG. 5.
Figure 7:
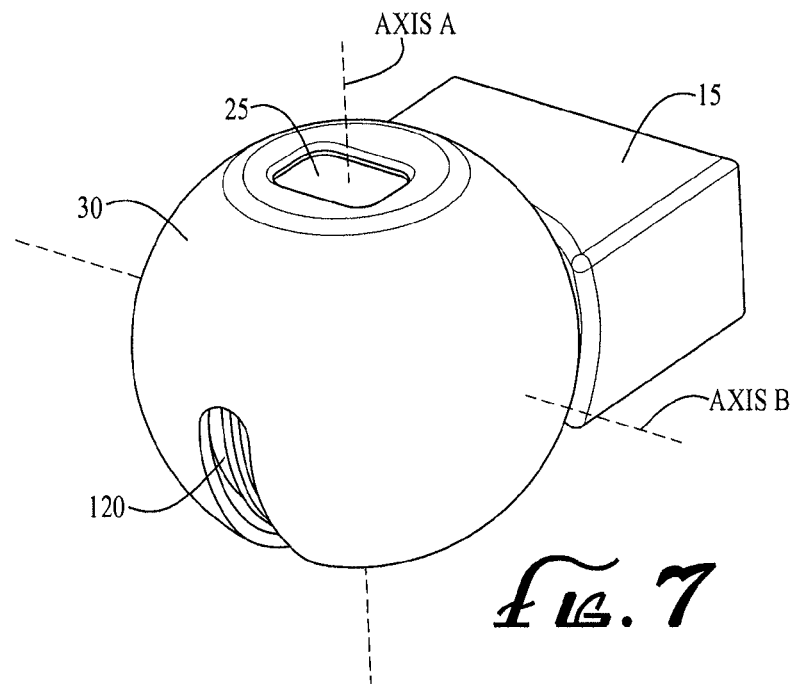
FIG. 7 is an isometric view of the data reading system of FIG. 2 in another rotated configuration about the second axis.
Figure 8:
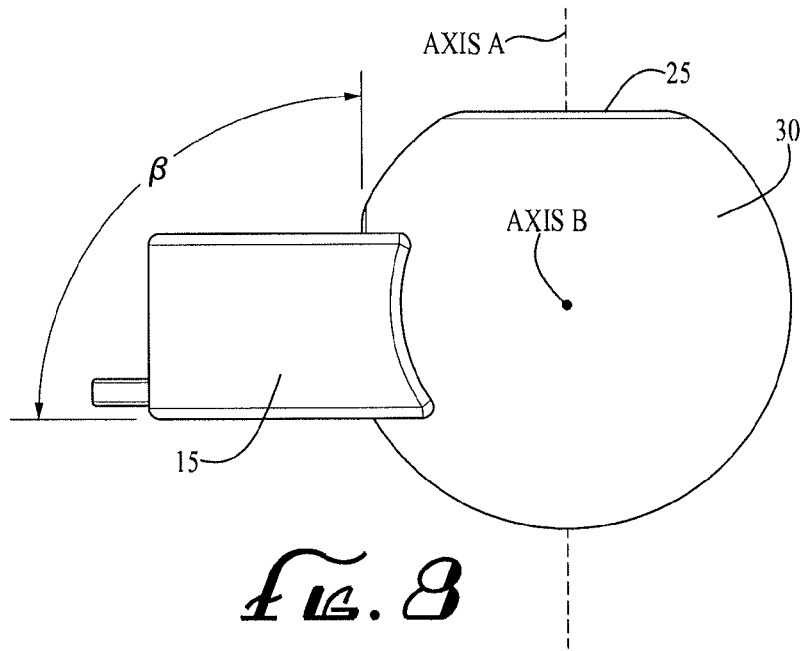
FIG. 8 is a side elevation view of the data reading system of FIG. 7.

With reference to FIGS. 5-8, the data reader 30 may rotate about the second axis B to form an angle α of +90 or an angle of β of −90 degrees as shown. FIGS. 5 and 6 illustrate an isometric and side elevation view, respectively, of the data reader 30 rotated about the second axis B (with no rotation about the first axis A) and forming an angle α of +90 degrees. Similarly, FIGS. 6 and 7 illustrate an isometric and side elevation view, respectively, of the data reader 30 rotated about the second axis B (with no rotation about the first axis A) and forming an angle β of −90 degrees. For reference purposes, the position of the data reader 30 illustrated in FIGS. 5 and 6 results from a downward movement of the data reader window 25 relative to its neutral position of FIG. 2. Similarly, the position of the data reader 30 illustrated in FIGS. 7 and 8 results from an upward movement of the data reader window 25 relative to its neutral position of FIG. 2. As is discussed further with reference to FIGS. 12-13, the rotational motion of the data reader 30 may be limited by the length of the track opening 110 and the flexible material/wrap 120.

As described previously, FIGS. 3-8 collectively illustrate example embodiments of the data reader 30 rotated about the first axis A with no rotation about the second axis B or vice versa. However, if desired, the data reader 30 may be moved to a position where the data reader 30 is rotated about both the first axis A and second axis B at the same time. For instance, as illustrated in FIGS. 9-10, the data reader 30 may be rotated ±120 degrees about the first axis A and thereafter rotated about the second axis B to position the data reader 30 as desired. Alternatively, the data reader 30 may first be rotated about the second axis B and thereafter rotated about the first axis A to a desired position.

The preceding description, with reference to FIGS. 2-10, generally describes examples of the rotational motion of the data reader 30. The following section, with reference to FIGS. 11-24, proceeds with a detailed description of the mechanisms of the data reader 30 that provide the functionality and support for such movement.

Figure 11:
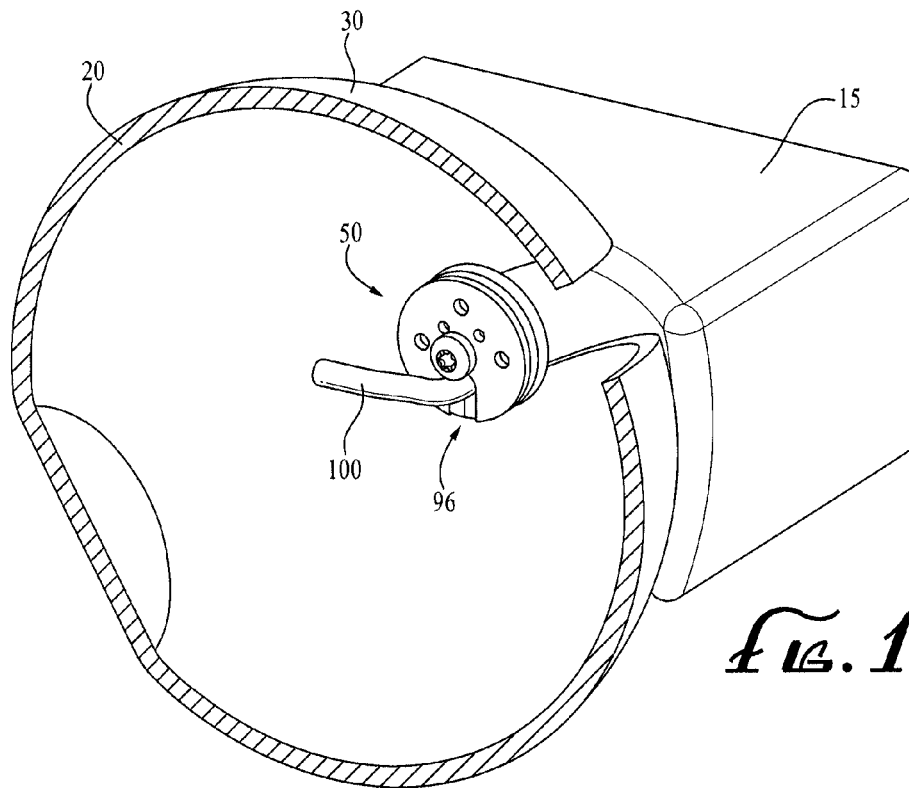
FIG. 11 is a partial cross-section view of the data reading system of FIG. 2 illustrating an example internal swivel clamp mechanism.
Figure 12:
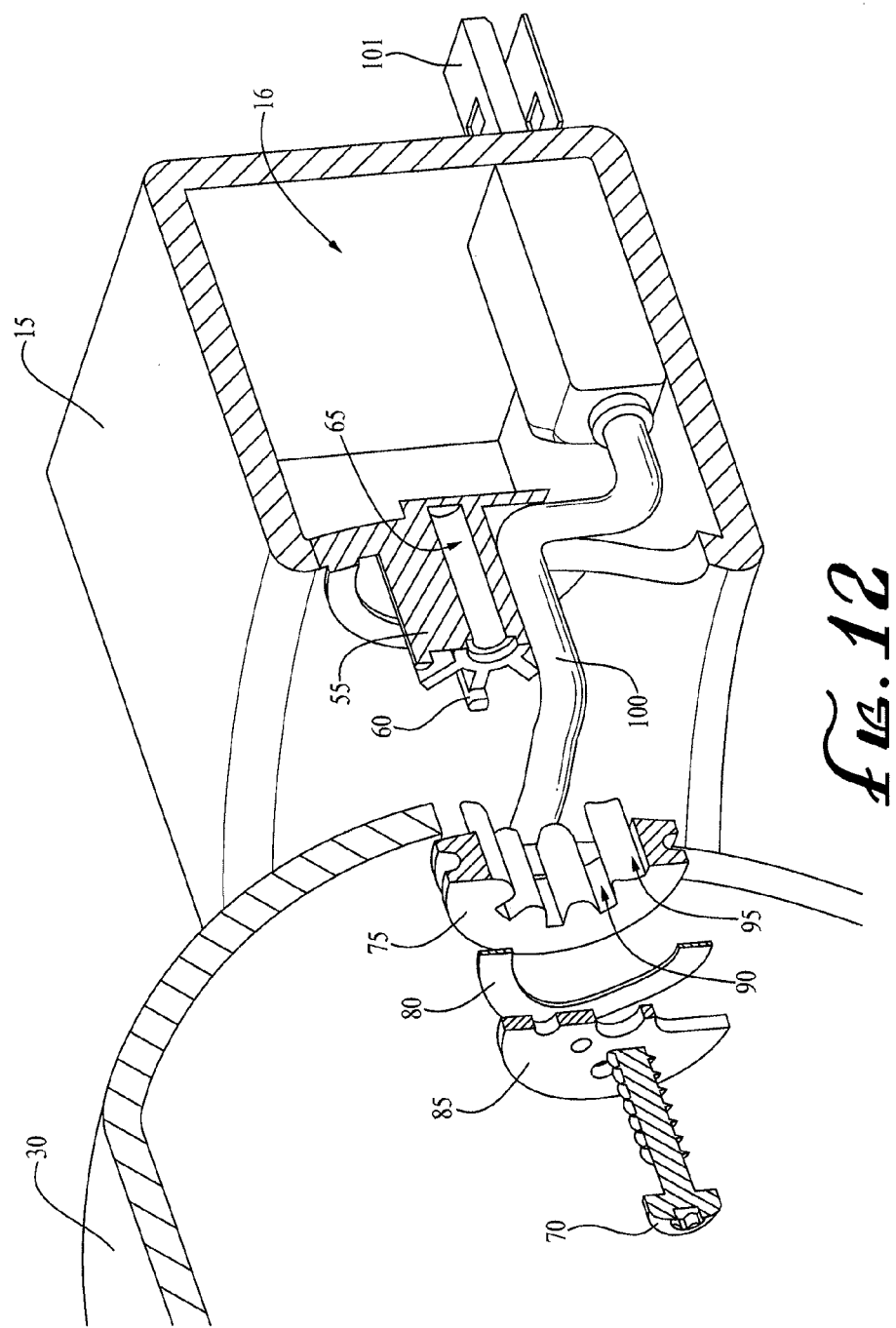
FIG. 12 is an enlarged, exploded view of the internal swivel clamp mechanism of FIG. 11.
Figure 10:
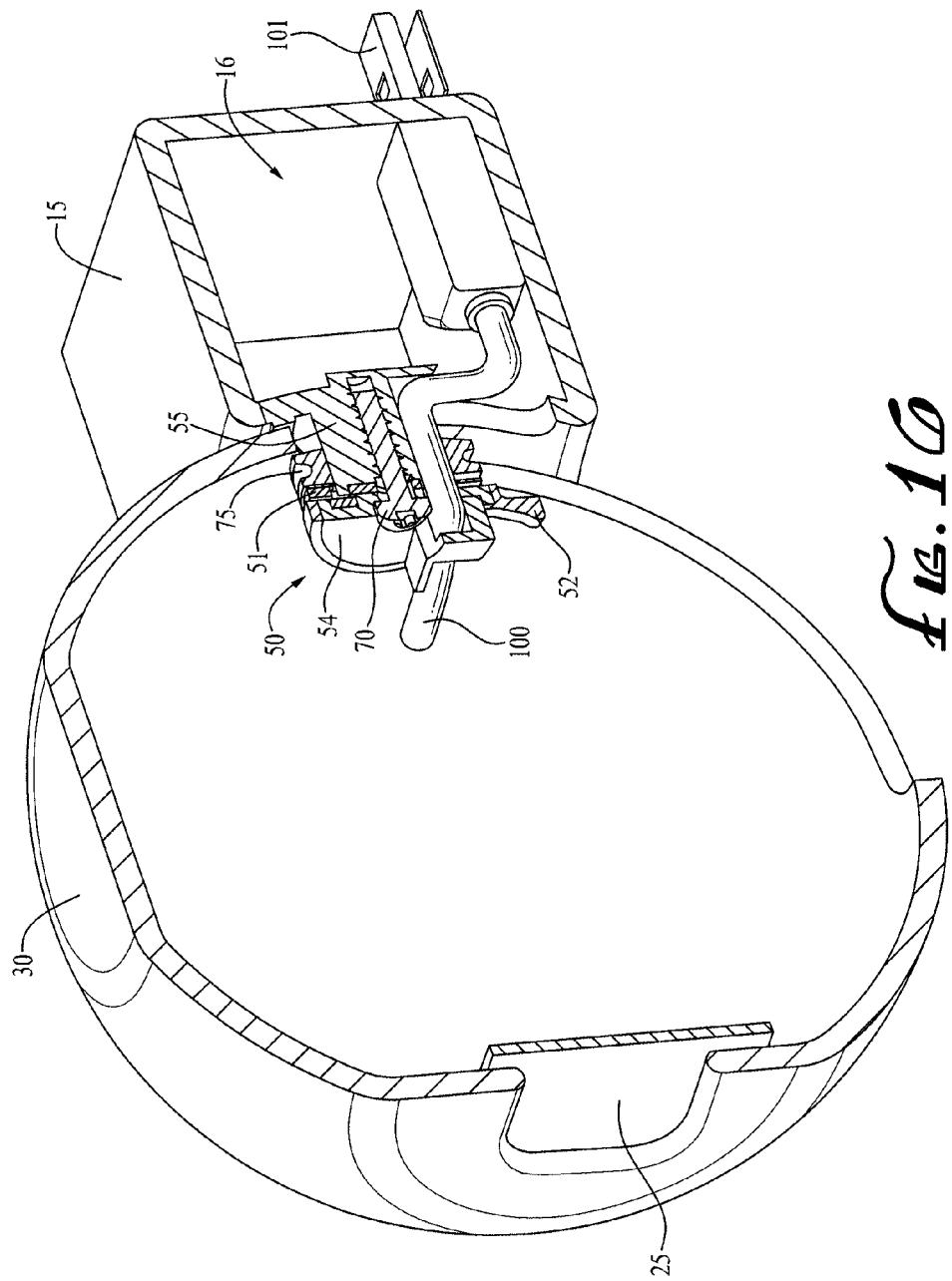

FIGS. 11-12 are cross-section views of the data reader 30 illustrating a swivel clamp mechanism 50 that retains the data reader 30 in position and, together with the flexible wrap 120 (see FIGS. 19-24), supports the rotational movement of the data reader 30 about the first axis A as described previously with particular reference to FIGS. 2-4. It should be noted that the flexible wrap 120 has been omitted from FIGS. 11-18 to avoid obscuring more pertinent aspects of the illustrated embodiments. In an assembled configuration of the data reader 30, the swivel clamp mechanism 50 is supported between the flexible wrap 120 as shown and further described in detail with reference to FIG. 23.

With particular reference to FIGS. 11-12, the data reading system 10 includes the data reader 30 supported on the base mount 15. As briefly described previously, the base mount 15 may be used to attach the data reader 30 to a structure (e.g. peripheral structure 5) using screws, pins, clips, or any other suitable mounting mechanisms. With particular reference to the exploded, cross-section view of FIG. 12, the base mount 15 includes a receiving or base post 55 having a plurality of ribs 60 and a central bore 65 extending through at least a portion of the base post 55. As is further described in detail below, the swivel clamp mechanism 50 is secured to the base mount 15 via a fastener 70 that is received in the central bore 65. In some embodiments, the fastener 70 may be a screw and the central bore 65 may be female-threaded to complement a thread size of the screw fastener 70. In other embodiments, the fastener 70 may instead be a non-threaded pin that is press fit or otherwise secured in the central bore 65. The base post 55 and ribs 60 are neither movable nor rotatable relative to the base mount 15, and may be formed as a unitary, continuous structure of the base mount 15. In other embodiments, the base post 55 and ribs 60 may be formed as a separate structure apart from the base mount 15 and thereafter rigidly attached to the base mount 15 so as to prevent rotation of these components relative to the base mount 15. The following sections describe additional details of the swivel clamp mechanism 50 and its assembly to the base post 55.

With particular reference to FIG. 12, the swivel clamp mechanism 50 includes a lock ring 75, a biasing member/spring 80 (e.g., a wave spring, curve spring, etc.), and a washer 85 all secured to the base post 55 via the fastener 70 as described previously. The lock ring 75 includes a plurality of channels or recesses 90 that are keyed (i.e., arranged in a corresponding configuration) to the ribs 60 of the base post 55 so that the channels 90 engage the ribs 60 of the base post 55 when the lock ring 75 is inserted into the base post 55. Since the base post 55 and the ribs 60 are fixed relative to the base mount 15, the lock ring 75 (and by extension, the swivel clamp mechanism 50) is prevented from rotating relative to the base mount 15 when the lock ring 75 is inserted into the base post 55.

The swivel clamp mechanism 50 further includes a spring 80 that is positioned between the lock ring 75 and the washer 85. When the swivel clamp mechanism 50 is assembled, the spring 80 provides sufficient resistance against the lock ring 75 to hold the housing 20 of the data reader 30 in a particular rotated position without requiring a separate locking mechanism. Accordingly, once the operator has set the desired position of the data reader 30, the spring 80 provides sufficient resistance to allow the data reader 30 to stay in place until the operator repositions or rotates the enclosure 20.

In some embodiments, the lock ring 75 includes a pathway or through hole 95 (see FIG. 12), and the washer 85 also includes a pathway (or through hole) 96 (see FIG. 11). The pathways 95, 96 are aligned when the swivel clamp mechanism 50 is assembled to accommodate and support a power/communication cable 100 operable for powering the internal components of the data reader 30 and/or for supporting communication between a peripheral device (not shown) and the data reader 30. In some embodiments, the spring 80 is an annulus (e.g., a ring-shaped spring) that is positioned between the lock ring 75 and washer 85 so as to not block or otherwise interfere with the pathways 95, 96 and the power/communication cable 100 when the swivel clamp mechanism 50 is secured to the base mount 15. With reference to FIG. 12, the power/communication cable 100 may run through an interior cavity 16 of the base mount 15 and into the housing 20 to connect with various components of the data reader 30. In some instances, only a plug or connection end 101 of the power/communication cable 100 may protrude from the base mount 15.

With general reference to FIG. 11, when the data reader 30 is rotated about the first axis A, the swivel clamp mechanism 50 remains fixed against the base post 55, and the housing 20 rotates about the swivel clamp mechanism 50 through the range of rotations as previously illustrated and described with particular reference to FIGS. 2-4. In this fashion, the data reading system 10 may support an internally routed power/communication cable 100 that does not interfere with rotation or pivoting movement of the data reader 30.

Figure 14:
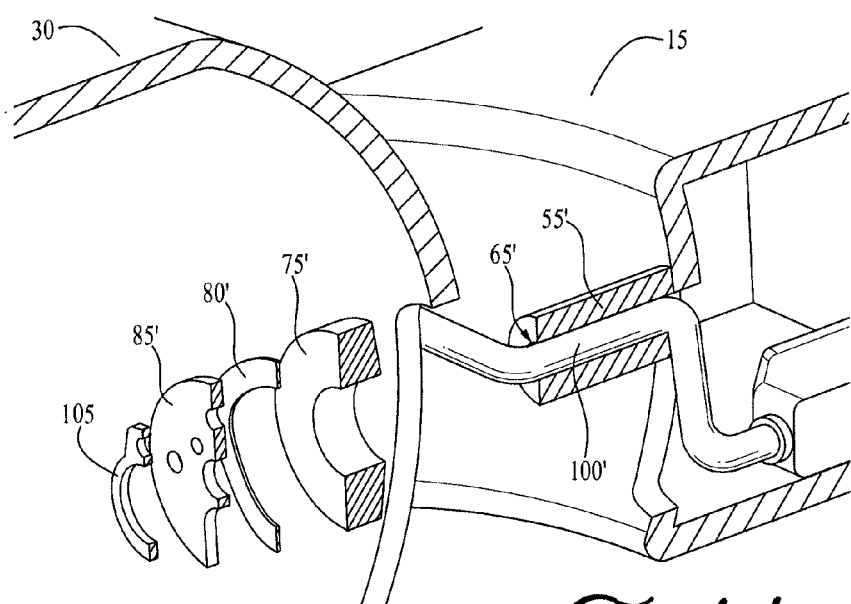
FIG. 14 is an enlarged, exploded view of the swivel clamp mechanism of FIG. 13.

FIGS. 13-14 illustrate another embodiment of the swivel clamp mechanism 50'. For convenience, the following description uses like reference numerals in prime notation to refer to components that have the same or similar structure/function as those described with reference to FIGS. 11-12. It should be understood that, unless otherwise specified, the components referenced in prime notation may have the same or substantially similar features as the corresponding components described with reference to FIGS. 11-12.

With reference to FIGS. 13-14, the swivel clamp mechanism 50' includes a lock ring 75', a spring 80', and a washer 85' arranged in a similar configuration as previously described with reference to swivel clamp mechanism 50. The base mount 15 includes a base post 55'. As illustrated in FIG. 14, the keying features (e.g., the ribs 60 and channels 90) may be omitted from the base post 55' and the lock ring 75'. Instead, the lock ring 75' may have an annular shape that encircles and slides around the base post 55'. Preferably, the lock ring 75' is dimensioned relative to the base post 55' so as to promote an interference fit between the components. In some embodiments, the screw 70 may also be omitted and the power/communication cable 100' may run through the central bore 65' of the swivel clamp mechanism 50'. When the swivel clamp mechanism 50' is assembled onto the base post 55', the power/communication cable 100' runs through the base post 55', the lock ring 75', the spring 80' and the washer 85' and helps retain these components in position. The swivel clamp mechanism 50' may further include a retainer ring 105 and a cap 108 (see FIG. 13) attached to the washer 85' to further retain the swivel clamp mechanism 50' together and against the base post 55'.

FIGS. 15-18 illustrate the swivel clamp mechanism 50 with a mechanism that provides a hard stop to define or limit the range of rotation of the housing 20 about the first axis A.

Figure 17:
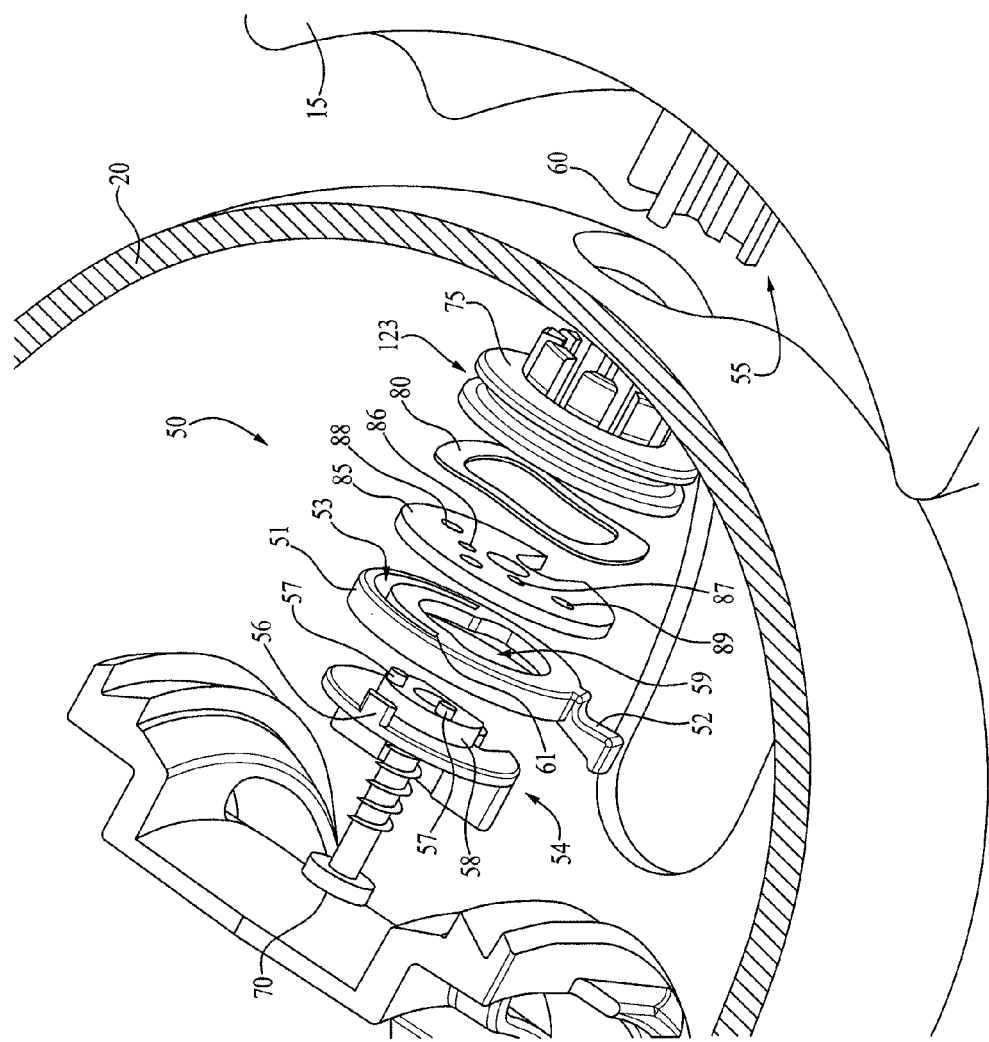
FIG. 17 is an enlarged, exploded view illustrating components of the swivel clamp mechanism of FIGS. 15 and 16.

With particular reference to FIG. 17, the swivel clamp mechanism 50 includes the lock ring 75, spring 80, and the washer 85 non-rotatably mounted onto the base post 55 in a similar fashion as previously described with reference to FIGS. 11 and 12. In addition to these components, the swivel clamp mechanism 50 further includes a stop ring 51 and a cover 54. The stop ring 51 carries an outwardly protruding stop arm 52 (see FIG. 15) and includes a semi-circular guideway or ride slot 53 extending across a portion of the stop ring 51. The cover 54 includes a swivel pin 56 and a rear base 58 with a plurality of lock pins 57 extending therefrom. As is further described in detail below, the lock pins 57 secure the cover 54 onto the washer 85. Further structural and functional details of the stop ring 51 and the cover 54 are described below.

With particular reference to FIG. 17, in an assembled configuration, the stop ring 51 is positioned against the washer 85. The cover 54 is thereafter overlaid onto the stop ring 51, with the rear base 58 of the cover 54 positioned or resting within an opening 59 of the stop ring 51, and the swivel pin 56 of the cover 54 positioned within the guideway 53 of the stop ring 51. As is further described in detail below, when the data reader 30 is rotated about the first axis A, the guideway 53 moves or slides around the stationary swivel pin 56 to accommodate the rotational movement of the data reader 30. To prevent the cover 54 from rotating, the lock pins 57 are inserted through a pair of openings 86, 87 on the washer 85. The washer 85 includes another pair of openings 88, 89 through which two of the post ribs 60 of the post 55 are inserted to prevent the washer 85 (and by extension the cover 54) from rotating in relation to the base mount base mount 15. While both the washer 85 and the cover 54 are non-rotatably mounted against the post 55, the stop ring 51 freely rotates in relation to the fixed cover 54 and its fixed swivel pin 56. Accordingly, when the housing 20 of the data reader 30 is rotated about the first axis A, the stop ring 51 rotates around the fixed swivel pin 56 as further described in detail below. A screw 70 secures the cover 54, the stop ring 51, the washer 85, the spring 80, and the lock ring 75 to the base mount 15.

Figure 18:
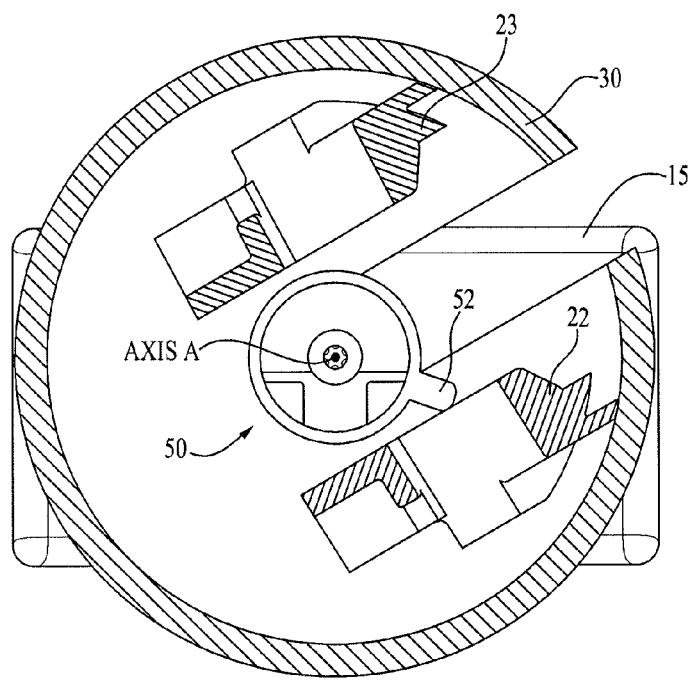
FIG. 18 is a cross-section view illustrating an example operation of the stop arm for the swivel clamp mechanism of FIGS. 15 and 16.

With particular reference to FIG. 18, the following section describes an example operation of the swivel clamp mechanism 50 and the stop ring 51 for limiting rotation of the data reader 30 to a desired range about the first axis A. As mentioned previously, the stop arm 52 extends outwardly from the stop ring 51, and the stop ring 51 rotates around the fixed swivel pin 56 via the guideway 53 when the housing 20 of the data reader 30 is rotated. Turning back to FIG. 18, the housing 20 includes a first side wall 22 and an opposite second side wall 23 positioned therein. Preferably, the side walls 22, 23 are spaced apart equally from either side of the swivel clamp mechanism 50. As the data reader 30 is rotated about the first axis A, the stop arm 52 moves toward one of the side walls 22, 23 depending on the direction of rotation. The stop ring 51 allows rotation of the housing 20 until the stop arm 52 contacts the first or second side wall 22, 23 (see FIG. 18). Contact between the stop arm 52 and the first side wall 22, for instance, inhibits further rotation of the housing 20 in that direction. At this point, the housing 20 can no longer be rotated in that direction, but may be rotated in the opposite direction through another range of rotations until the stop arm 52 makes contact with the second side wall 23.

In some embodiments, the length of the guideway 53 is dimensioned relative to the stop arm 52 and the first and second side walls 22, 23 so that when the stop arm 52 contacts the first or second side walls 22, 23, the swivel pin 56 simultaneously reaches the end of the guideway 53 and contacts an end 61 of the stop ring 51. In other words, when the stop arm 52 contacts the first side wall 22, the swivel pin 56 also contacts the end 61 of the stop ring 51. In such a configuration, the swivel clamp mechanism 50 provides two independent points for controlling and limiting rotation of the data reader 30, which may help evenly distribute mechanical forces between the stop arm 52 and the swivel pin 56 and help avoid damage to either component.

In one embodiment, the length of the guideway 53 and the positioning of the side walls 22, 23 provide the stop arm 52 with the freedom to swing such that the data reader 30 is rotatable between −120 degrees and +120 degrees about the first axis A as previously described with reference to FIGS. 3-4. It should be understood that these rotational range limits are description examples only. Other range limits may be implemented and thus these specific ranges are not intended to be limiting. For example, if desired, the range of rotation of the enclosure 20 may be increased (such as by lengthening the guideway 53 in the stop ring 51 and by moving the side walls 22, 23 further away from the swivel clamp mechanism 50 and/or shortening the length of the stop arm 52) or decreased (such as by shortening the guideway 53 and by moving the side walls 22, 23 closer to the swivel clamp mechanism 50 and/or increasing the length of the stop arm 52).

Figure 19:
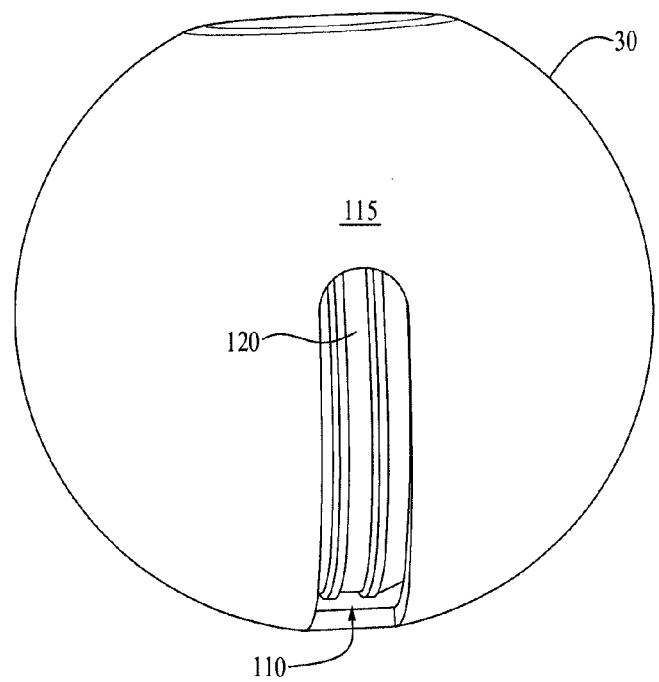
FIG. 19 is a rear view of a data reader housing illustrating a flexible wrap for supporting rotational motion of the data reader.

The following section describes details and components for accommodating rotational movement of the data reader 30 about the second axis B (and also about the first axis A) as was briefly described previously with reference to FIGS. 5-8. FIGS. 19-23 collectively illustrate various components of the housing 20 that cooperatively support rotational motion of the data reader 30. With reference to FIG. 19, the housing 20 includes an elongated track opening or slot 110 on an exterior surface 115. The housing 20 further supports or carries a flexible wrap 120 located on an interior of the housing 20, where a portion of the flexible wrap 120 extends across the slot 110 to protect the interior components housed within the housing 20. As is further described in detail below, the flexible wrap 120 supports the swivel clamp mechanism 50 and further accommodates the rotational movement of the data reader 30. In some embodiments, the flexible wrap 120 comprises rubber, plastic, bristles/brushes, or another suitable flexible/deformable material or material combination.

Figure 20:
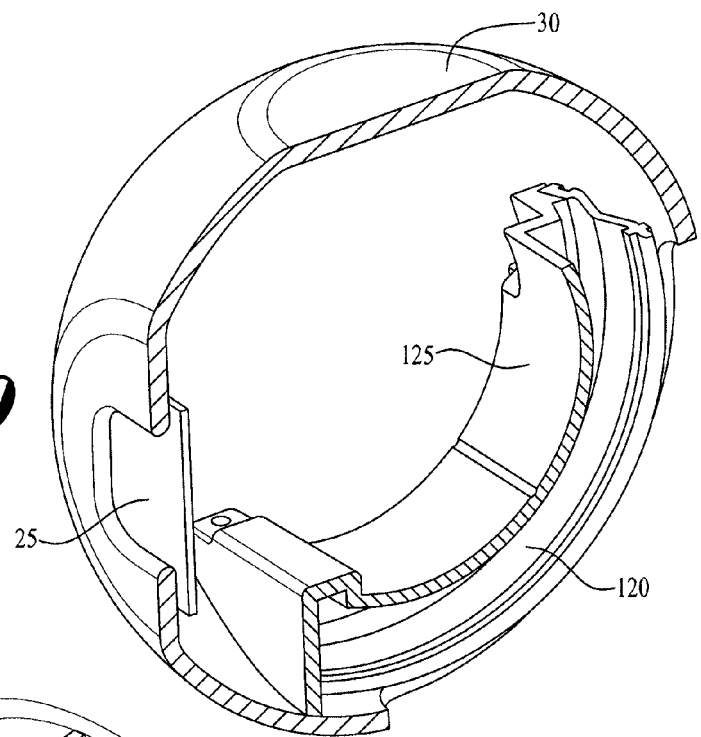
FIGS. 20 and 21 are cross-section views of the housing of FIG. 19 illustrating additional details of the flexible wrap.
Figure 21:
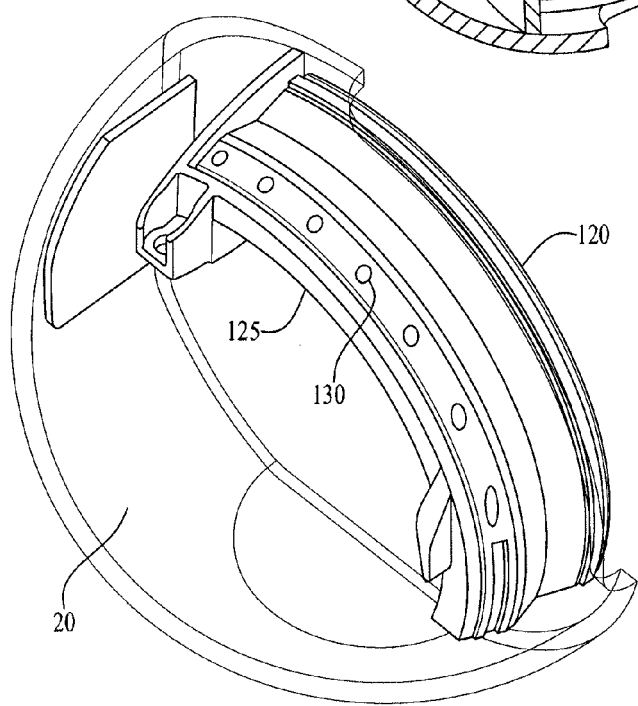
Figure 22:
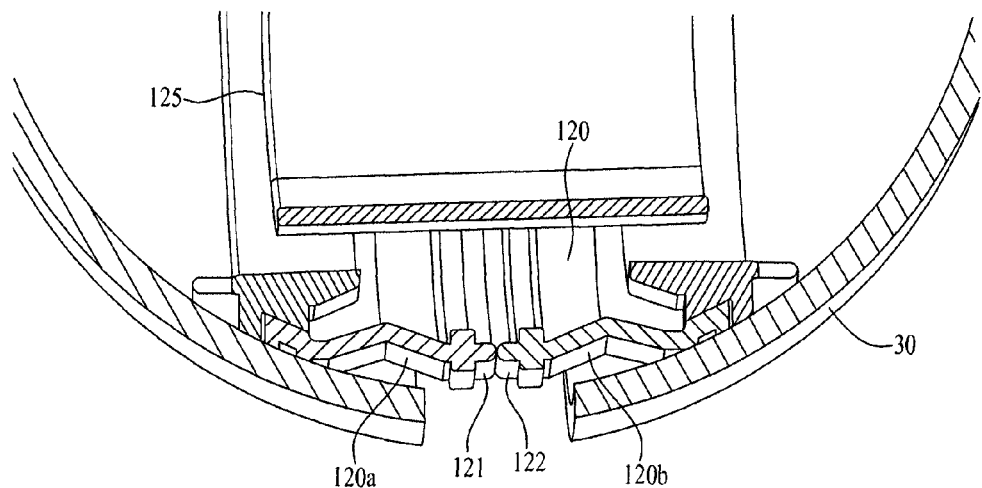
FIG. 22 is a cross-section, top plan view of the housing of FIG. 19 illustrating the flexible wrap in a closed configuration with the swivel clamp mechanism removed.

As is illustrated in FIG. 22, the flexible wrap 120 may be split into two halves 120a, 120b (for reference, the cross-section views in FIGS. 20-21 each illustrate a half of the flexible wrap 120). With reference to FIG. 21, each of the halves 120a, 120b is attached to a support base 125 on an interior portion of the enclosure 20. The flexible wrap 120 may be secured to the support base 125 using pins (not shown) inserted into a series of pin holes 130 spaced apart on the flexible wrap 120. In other embodiments, the flexible wrap 120 may be adhered to the support base 125 or otherwise attached using other suitable means. It is noted that FIG. 21 illustrates an outline of the housing 20 for reference purposes.

The following section describes the interaction between the swivel clamp mechanism 50 and the flexible wrap 120 for supporting rotational motion of the data reader 30 about both the first and second axes. With particular reference to FIG. 22, the bordering edge or end 121, 122 of each of the halves 120a, 120b of the flexible wrap 120 are rounded and contact one another when the flexible wrap 120 is in a closed configuration. As best seen in FIG. 17, the lock ring 75 of the swivel clamp mechanism 50 includes a recessed channel or groove 123 around its circumference (such that the lock ring 75 resembles a spool structure), the channel 123 having a depth that corresponds to the rounded edges 121, 122 of the flexible wrap. In an assembled configuration, the swivel clamp mechanism 50 is positioned between the edges 121, 122 of the flexible wrap 120, so that the edges 121, 122 sit in the channel 123 of the lock ring 75 and allow the swivel clamp mechanism 50 to ride between the edges 121, 122 of the flexible wrap 120.

Figure 24:
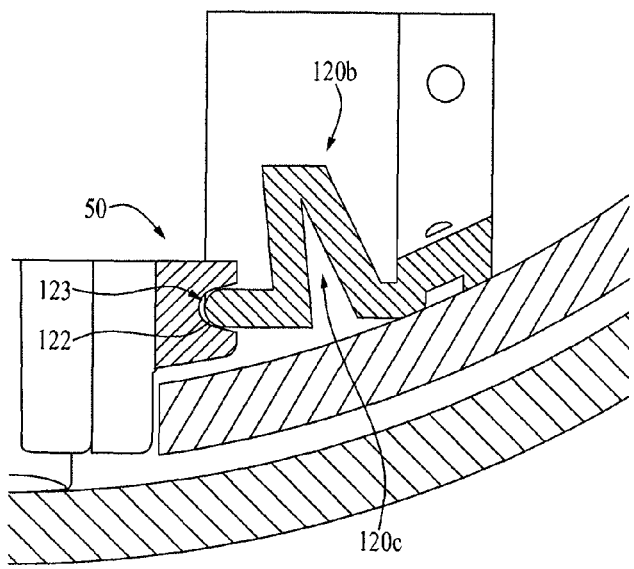
FIG. 24 is a schematic view of the assembly of FIG. 23 illustrating additional details of the flexible wrap and the swivel clamp mechanism.
Figure 23:
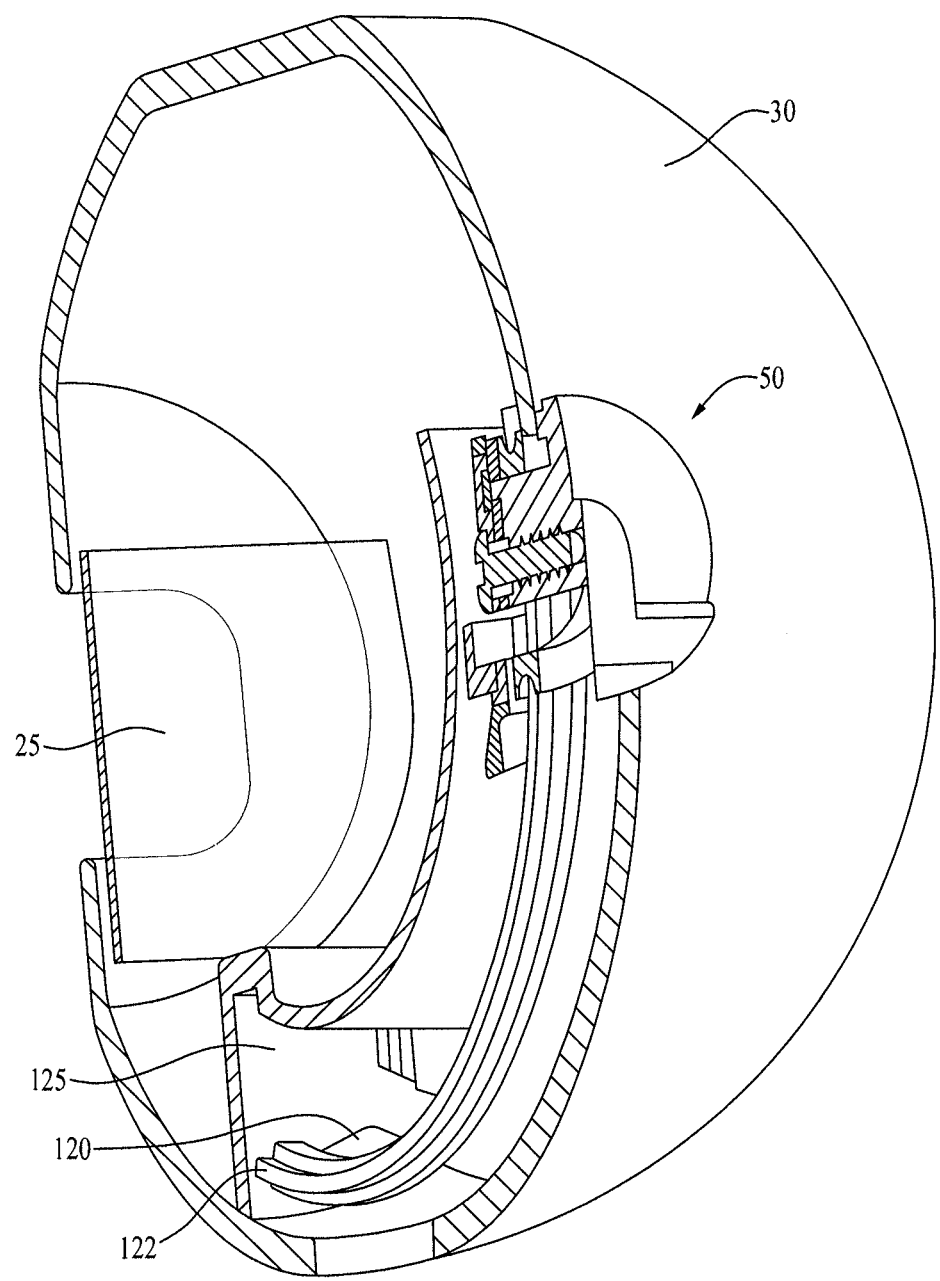
FIG. 23 is a cross-section view of the housing of FIG. 19 illustrating the swivel clamp mechanism and the flexible wrap in an example assembly.

With particular reference to FIGS. 22-24, the following description illustrates an example operation of the flexible wrap 120 and the swivel clamp mechanism 50. As mentioned previously, FIG. 22 illustrates the flexible wrap 120 when the two halves 120a, 120b are in a closed positioned (the embodiment is shown without the swivel clamp mechanism 50 for clarity). In this position, the edges 121, 122 of the flexible wrap 120 contact each other to substantially seal the inside of the housing 20 to protect the internal optics and other components of the data reader 30. With particular reference to FIGS. 23-24, when the swivel clamp mechanism 50 is in position between the flexible wrap 120, a portion 120c of each of the halves 120a, 120b of the flexible wrap 120 deforms or collapses away from the midpoint of the flexible wrap 120 to accommodate the swivel clamp mechanism 50 (see schematic illustrated in FIG. 24).

As the housing 20 of the data reader 30 is rotated about the second axis B, the swivel clamp mechanism 50 (via the channel 123 of the lock ring 75) rides between the edges 121, 122 of the flexible wrap 120 to accommodate the rotational movement of the data reader 30. As illustrated in FIG. 23, only a small region of the edges 121, 122 of the flexible wrap 120 are positioned in the channel 123 of the lock ring 75 at any given time. The region of the edges 121, 122 that is not in the channel 123 of the lock ring 75 remain in the closed position to maintain as tight a seal as possible within the housing 20.

As the housing 20 is rotated about the second axis B, the edges 121, 122 of the flexible wrap 120 continue riding in the channel 123. As the data reader 30 is moved to new positions, different regions of the edges 121, 122 of the flexible wrap 120 engage the channel 123 of the lock ring 75 and other portions that previously engaged the channel 123 collapse onto one another to seal the housing 20. The flexible wrap 120 is sufficiently resilient such that the edges 121, 122 automatically return to the closed position as they move out of contact with the channel 123 so that the interior of the housing 20 remains substantially sealed to protect the power/communication cable 100 and other interior components of the data reader 30.

Rotation of the housing 20 about the second axis B may be defined or limited by the length dimensions of the flexible wrap 120 and/or the slot 110. For example, in some embodiments, the housing 20 may be rotated about the second axis B until the swivel clamp mechanism 50 runs the length of the flexible wrap 120, at which point, the swivel clamp mechanism 50 may contact an interior portion of the housing 20 in the slot 110 (see e.g., FIG. 23). At this point, the swivel clamp mechanism 50 can no longer move in that direction to accommodate further rotation of the data reader 30 about the second axis B.

As mentioned previously, the flexible wrap 120 also supports rotational movement of the data reader 30 about the first axis A. As described with reference to FIGS. 22-24, the swivel clamp mechanism 50 is positioned between the ends 121, 122 of the flexible wrap 120 when the data reader 30 is fully assembled. In this configuration, when the housing 20 is rotated about the first axis A, the ends 121, 122 of the flexible wrap 120 rotate or slide along the channel 123 of the lock ring 75 to allow for rotation of the housing 20. In such a configuration, the swivel clamp mechanism 50 as a whole does not rotate relative to the base mount 15 so as to avoid potentially damaging the communication cable 100 running through the swivel clamp mechanism 50. However, as described with particular reference to FIGS. 15-18, certain components of the swivel clamp mechanism 50 (for example, the stop ring 51) may rotate relative to the base mount 15 to limit rotational movement of the data reader 30 about the first axis A.

As is described with reference to the figures, certain embodiments may be capable of achieving certain advantages, including one or more of the following: (1) providing a data reader with a base mount and pivotable enclosure for rotating the data reader about two rotational axes simultaneously; (2) providing an adjustable data reader with all the wiring and power/communication cables housed in the pivotable enclosure without limiting rotation of the data reader; (3) providing an adjustable data reader with a stop mechanism that limits rotation about at least one of the rotational axes beyond a predetermined position; and (4) providing an adjustable data reader with a flexible material/wrap that accommodates rotational movement of the data reader and substantially seals the interior housing of the data reader.

Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system for reading encoded data from an item, comprising:
   a base mount having a receiving post extending from an exterior surface of the base mount, the base mount further including an internal cavity;
   a housing having a scan window, the housing including an elongated opening on an exterior surface thereof;
   a data reader disposed within an interior of the housing, the data reader configured to view through the scan window to capture and decode encoded data from an item passing in front of the scan window;
   a flexible material having a first material portion and a second material portion supported by the housing, the flexible material extending across the elongated opening of the housing; and
   a clamp supported between the first and second material portions of the flexible material, the clamp non-rotatably mounted onto the receiving post of the base mount to secure the housing to the base mount,
   wherein the first and second material portions move relative to the clamp when the housing is rotated about a first axis, and wherein the clamp slides between the first and second material portions when the housing is rotated about a second axis different from the first axis.

2. The data reading system of claim 1, wherein the clamp includes a recessed channel extending around an exterior surface, and wherein the first and second material portions of the flexible material each include an end that contacts the recessed channel to retain the clamp between the first and second material portions of the flexible material.

3. The data reading system of claim 2, wherein the edge of each of the first and second material portions of the flexible material rides in the recessed channel of the clamp when the housing is rotated about the second axis.

4. The data reading system of claim 1, wherein the receiving post includes ribs extending radially outwardly therefrom, and wherein the clamp further includes a locking portion having interior grooves formed thereon, the grooves corresponding in shape to the ribs such that the ribs engage the grooves of the locking portion when the locking portion is inserted into the receiving post to prevent the clamp from rotating relative to the receiving post when the housing is rotated about the first axis.

5. The data reading system of claim 1, wherein the receiving post and clamp each include a through hole that forms a passageway from the internal cavity of the base mount to the interior portion of the housing when the clamp is mounted onto the receiving post, the data reading system further comprising an electrical cable extending from the base mount through the passageway and into the interior of the housing to communicate with the data reader without limiting rotation of the housing about either or both the first and second axes.

6. The data reading system of claim 1, the clamp further including a biasing member that provides resistance to maintain a rotated position of the housing.

7. The data reading system of claim 1, the clamp further comprising a stop mechanism to limit rotation of the housing about the first axis.

8. The data reading system of claim 7, the stop mechanism further comprising:
   a stop arm extending outwardly from an exterior surface of the clamp; and
   a first stop and a second stop spaced apart from one another and located within the interior of the housing,
   wherein the stop arm moves between the first stop and the second stop when the housing is rotated about the first axis, and wherein the first stop arrests rotation of the housing in a first direction when the stop arm contacts the first stop, and the second stop arrests rotation of the housing in a second direction when the stop arm contacts the second stop.

9. The data reading system of claim 1, the clamp further comprising:
   a locking portion non-rotatably mounted to the receiving post to resist rotational movement of the clamp relative to the receiving post;
   a stop ring mounted to the locking portion and rotatable relative to the locking portion and the receiving post, the stop ring including a guideway formed on at least a portion of the stop ring; and
   a cover overlaying the stop ring, the cover non-rotatably mounted to the locking portion, the cover having a swivel pin, wherein the swivel pin is positioned in the guideway and rides in the guideway in response to rotation of the housing.

10. The data reading system of claim 9, wherein the guideway further includes a first stop and a second stop, wherein the swivel pin rides freely in the guideway between the first stop and the second stop in response to rotation of the housing, and wherein the first stop arrests rotation of the housing in a first direction when the swivel pin contacts the first stop, and the second stop arrests rotation of the housing in a second direction when the swivel contacts the second stop.

11. A data reading system for reading encoded data from an item, comprising:
   a base mount having a receiving post extending from an exterior surface of the base mount, the base mount further including an internal cavity;
   a housing having a scan window, the housing including an elongated opening on an exterior surface thereof;
   a data reader disposed within an interior of the housing, the data reader configured to view through the scan window to capture and decode encoded data from an item passing in front of the scan window; and
   a clamp non-rotatably mounted onto the receiving post of the base mount, the clamp securing the housing to the base mount, wherein the housing is rotatable relative to the receiving post, and wherein the clamp supports rotational motion of the housing about a first and second axis, the clamp further comprising a stop mechanism to limit rotation of the housing about the first axis, the stop mechanism further comprising:
      a first stop and a second stop spaced apart from one another; and
      a stop arm, wherein the stop arm moves between the first stop and the second stop when the housing is rotated about the first axis, and wherein the first stop arrests rotation of the housing about the first axis in a first direction when the stop arm contacts the first stop, and the second stop arrests rotation of the housing about the first axis in a second direction when the stop arm contacts the second stop.

12. The data reading system of claim 11, wherein the receiving post and clamp each include corresponding keying features to prevent the clamp from rotating relative to the receiving post when the housing is rotated about the first axis.

13. The data reading system of claim 11, the clamp further comprising:
   a lock ring non-rotatably mounted to the receiving post to resist rotational movement of the clamp relative to the receiving post;
   a stop ring mounted to the locking portion and rotatable relative to the lock ring and the receiving post, the stop ring carrying an outwardly protruding arm and including a guideway formed on at least a portion of the stop ring; and
   a cover overlaying the stop ring, the cover non-rotatably mounted to the lock ring, the cover having a swivel pin, wherein the swivel pin is positioned in the guideway and rides in the guideway in response to rotation of the housing about the first axis.

14. The data reading system of claim 13, wherein the receiving post, lock ring, stop ring, and cover each include a through hole that forms a passageway from the internal cavity of the base mount to the interior portion of the housing when the clamp is mounted onto the receiving post, the data reading system further comprising an electrical cable extending from the base mount through the passageway and into the interior of the housing to communicate with the data reader without limiting rotation of the housing about either or both the first and the second axes.

15. The data reading system of claim 13, the clamp further including a biasing member positioned between the stop ring and the lock ring, the biasing member providing resistance to maintain a rotated position of the housing.

16. A data reading system for reading encoded data from an item, comprising:
   a base mount having a receiving post extending from an exterior surface of the base mount, the base mount further including an internal cavity;
   a housing having a scan window, the housing including an elongated opening on an exterior surface thereof;
   a data reader disposed within an interior of the housing, the data reader configured to view through the scan window to capture and decode encoded data from an item passing in front of the scan window; and a clamp non-rotatably mounted onto the receiving post of the base mount, the clamp securing the housing to the base mount, wherein the housing is rotatable relative to the receiving post, and wherein the clamp supports rotational motion of the housing about a first and second axis, the clamp further comprising:
- a lock ring non-rotatably mounted to the receiving post to resist rotational movement of the clamp relative to the receiving post;
- a stop ring mounted to the locking portion and rotatable relative to the lock ring and the receiving post, the stop ring carrying an outwardly protruding arm and including a guideway formed on at least a portion of the stop ring; and
- a cover overlaying the stop ring, the cover non-rotatably mounted to the lock ring, the cover having a swivel pin, wherein the swivel pin is positioned in the guideway and rides in the guideway in response to rotation of the housing about the first axis.

17. The data reading system of claim 16, wherein the receiving post, lock ring, stop ring, and cover each include a through hole that forms a passageway from the internal cavity of the base mount to the interior portion of the housing when the clamp is mounted onto the receiving post, the data reading system further comprising an electrical cable extending from the base mount through the passageway and into the interior of the housing to communicate with the data reader without limiting rotation of the housing about either or both the first and the second axes.

18. The data reading system of claim 16, the clamp further including a biasing member positioned between the stop ring and the lock ring, the biasing member providing resistance to maintain a rotated position of the housing.

19. The data reading system of claim 16, wherein the receiving post and clamp each include corresponding keying features to prevent the clamp from rotating relative to the receiving post when the housing is rotated about the first axis.

20. The data reading system of claim 16, the clamp further comprising a stop mechanism to limit rotation of the housing about the first axis, the stop mechanism further comprising:
- a first stop and a second stop spaced apart from one another; and
- a stop arm, wherein the stop arm moves between the first stop and the second stop when the housing is rotated about the first axis, and wherein the first stop arrests rotation of the housing about the first axis in a first direction when the stop arm contacts the first stop, and the second stop arrests rotation of the housing about the first axis in a second direction when the stop arm contacts the second stop.

* * * * *